United States Patent
McIntyre et al.

(10) Patent No.: US 12,202,453 B2
(45) Date of Patent: Jan. 21, 2025

(54) ANTI-ROTATION SLEEVE FOR BRAKE SYSTEM

(71) Applicant: ZF Active Safety US Inc., Livonia, MI (US)

(72) Inventors: Matthew McIntyre, Tiffin, OH (US); Diego Cusi, Northville, MI (US); Satoshi Yumoto, Fujisawa (JP); Kazutoyo Kuroki, Sakura (JP); Kenta Sekido, Utsunomiya (JP)

(73) Assignee: ZF Active Safety US Inc., Livonia, MI (US)

( * ) Notice: Subject to any disclaimer, the term of this patent is extended or adjusted under 35 U.S.C. 154(b) by 511 days.

(21) Appl. No.: 17/552,631

(22) Filed: Dec. 16, 2021

(65) Prior Publication Data

US 2023/0192055 A1 Jun. 22, 2023

(51) Int. Cl.
*B60T 13/74* (2006.01)
*B60T 7/04* (2006.01)
*B60T 7/06* (2006.01)

(52) U.S. Cl.
CPC ............ *B60T 13/745* (2013.01); *B60T 7/042* (2013.01); *B60T 7/06* (2013.01)

(58) Field of Classification Search
CPC . B60T 7/042; B60T 7/06; B60T 8/368; B60T 11/16; B60T 11/165; B60T 11/24; B60T 13/16; B60T 13/745; F16D 2125/40
See application file for complete search history.

(56) References Cited

U.S. PATENT DOCUMENTS

| | | | | |
|---|---|---|---|---|
| 8,656,798 | B2 * | 2/2014 | Kawahara | F16H 25/20 |
| | | | | 74/89.32 |
| 11,285,931 | B2 | 3/2022 | Lee | |
| 2015/0285348 | A1 * | 10/2015 | Ikeda | H02K 7/06 |
| | | | | 74/89.36 |
| 2017/0350479 | A1 * | 12/2017 | Shimizu | B23P 19/084 |
| 2018/0029575 | A1 * | 2/2018 | Malwitz | F16D 65/16 |
| 2020/0298813 | A1 * | 9/2020 | Lee | B60T 13/66 |
| 2020/0331446 | A1 * | 10/2020 | Yun | B60T 8/3265 |
| 2022/0144238 | A1 * | 5/2022 | Weh | F15B 15/14 |
| 2023/0070222 | A1 * | 3/2023 | Nagel | B60T 13/686 |

FOREIGN PATENT DOCUMENTS

| | | |
|---|---|---|
| DE | 102016210221 A1 | 12/2017 |
| DE | 102020202843 A1 | 10/2020 |
| JP | 2013075605 A | 4/2013 |
| JP | 2015123934 A | 7/2015 |

OTHER PUBLICATIONS

German search report for corresponding application No. 102022212962. 8, dated Oct. 27, 2023, pp. 1-14. English translation not provided.

* cited by examiner

*Primary Examiner* — Nicholas J Lane
(74) *Attorney, Agent, or Firm* — Kristin L. Murphy

(57) ABSTRACT

An anti-rotation sleeve for an electric brake system having a shaft received in and movable relative to a passage of a housing includes a body extending along a centerline from a first end to a second end. An inner surface defines a passage for receiving the shaft and pockets extending radially from the passage configured to provide sliding interfaces with tabs on the shaft. Projections provided on an outer surface of the body and extending parallel to the centerline cooperate with the housing to prevent rotation of the sleeve relative to the housing. Each projection is aligned with a normal direction of one of the interfaces.

16 Claims, 10 Drawing Sheets

ANTI-ROTATION SLEEVE FOR BRAKE SYSTEM

TECHNICAL FIELD

The present invention relates generally to brake systems and, more specifically, relates to a sleeve for preventing rotation between components in an electronic brake system.

BACKGROUND

Electronically controlled brake systems typically include a spindle that is axially movable within a housing in response to rotation of a motor-driven nut. A sleeve cooperates with the housing and the spindle to prevent relative rotation therebetween but allow for relative axial movement therebetween. To this end, the sleeve can have anti-rotation features that help to prevent rotation of the sleeve within/relative to the housing.

SUMMARY

In one example, an anti-rotation sleeve for an electric brake system having a shaft received in and movable relative to a passage of a housing includes a body extending along a centerline from a first end to a second end. An inner surface defines a passage for receiving the shaft and pockets extending radially from the passage configured to provide sliding interfaces with tabs on the shaft. Projections provided on an outer surface of the body and extending parallel to the centerline cooperate with the housing to prevent rotation of the sleeve relative to the housing. Each projection is aligned with a normal direction of one of the interfaces.

In another example, an anti-rotation sleeve for an electric brake system having a shaft received in and movable relative to a passage of a housing includes a body extending along a centerline from a first end to a second end. An inner surface defines a passage for receiving the shaft and pockets extending radially from the passage configured to receive tabs on the shaft. The body is formed from a first material. An insert is provided in each pocket for forming a sliding interface with the tabs. Each insert is formed from a second material different from the first material. A projection provided on an outer surface of the body extends parallel to the centerline for cooperating with the housing to prevent rotation of the sleeve relative to the housing.

Other objects and advantages and a fuller understanding of the invention will be had from the following detailed description and the accompanying drawings.

DETAILED DESCRIPTION

The present invention relates generally to brake systems and, more specifically, relates to a sleeve for preventing rotating between components in an electronic brake system.

Figure 1A:
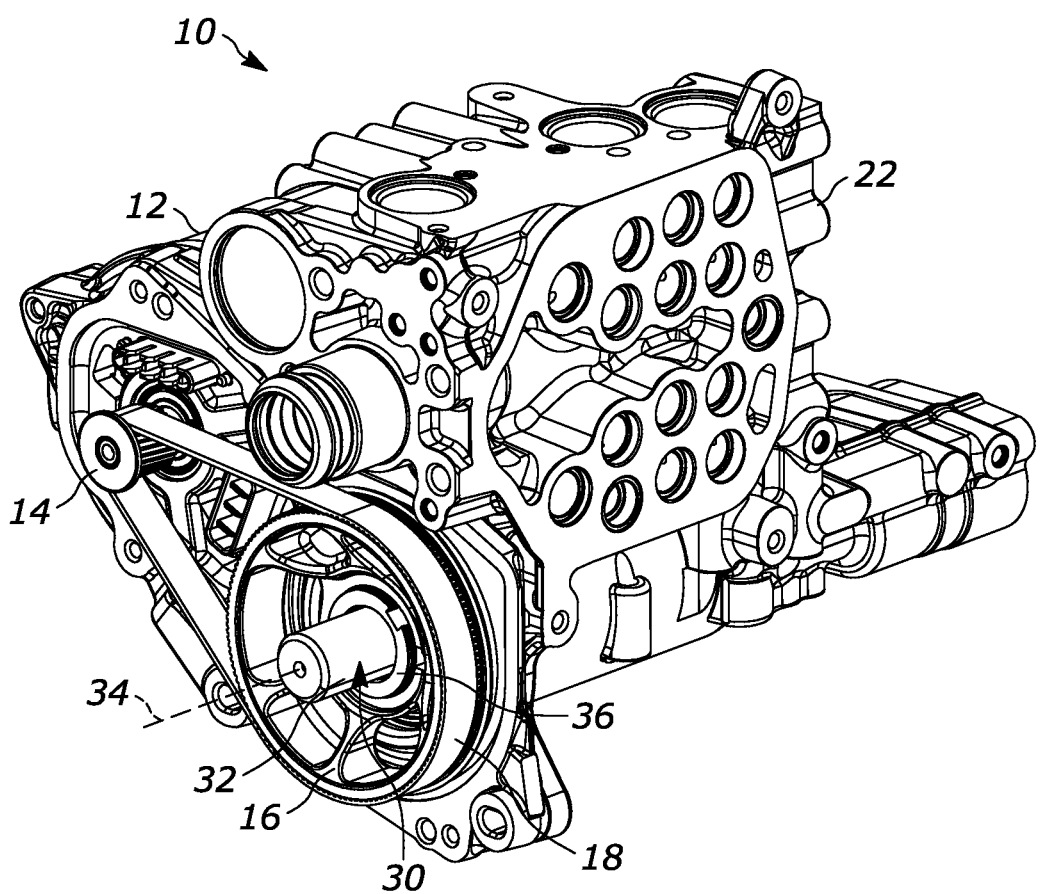
FIG. 1A is a schematic illustration of an example electronic brake system in accordance with the present invention.
Figure 1B:
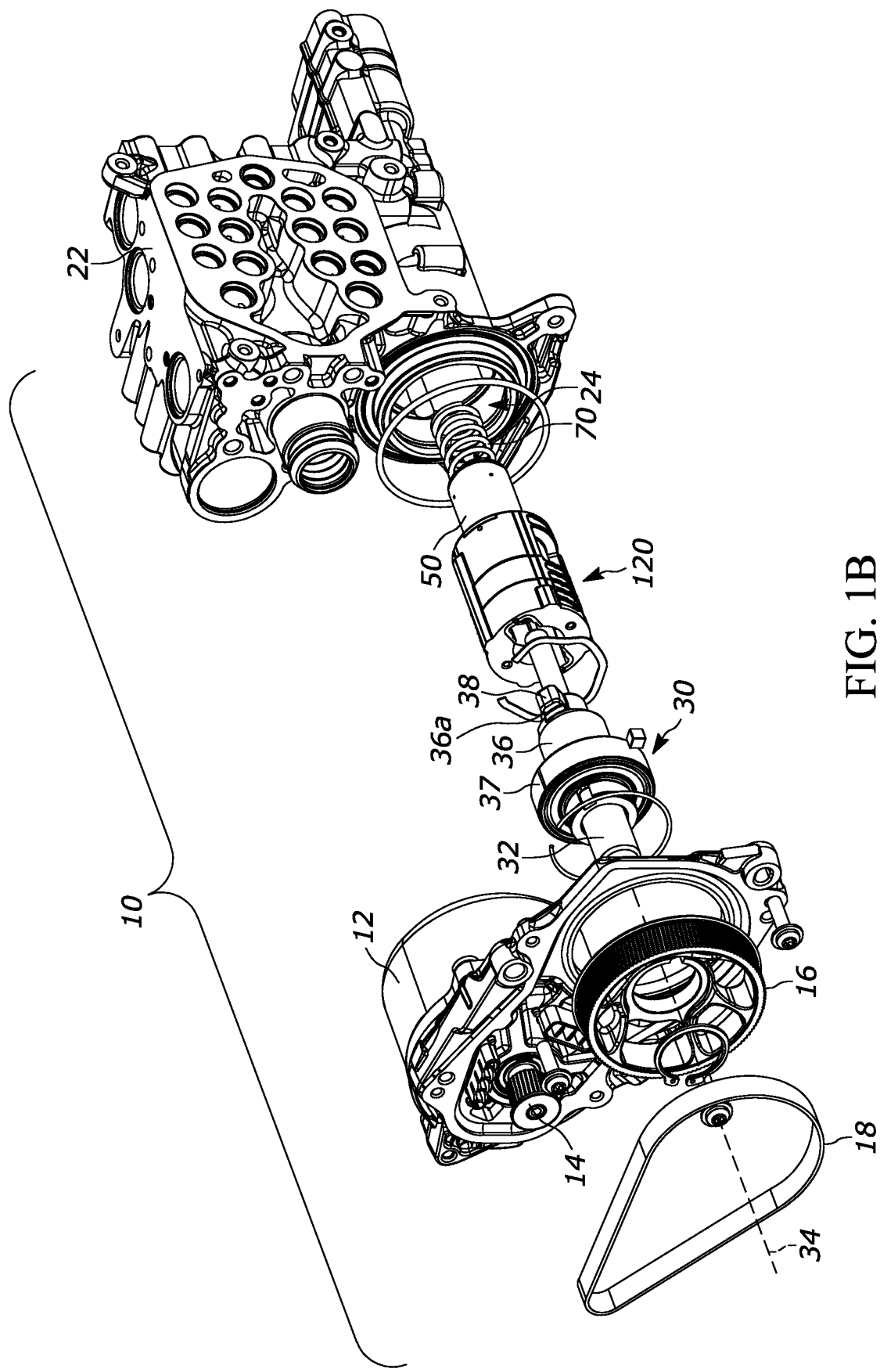
FIG. 1B is an exploded view of the electronic brake system of FIG. 1A.

FIGS. 1A-1B illustrate an example electric brake system 10 in accordance with the present invention. The electric brake system 10 can include or cooperate with hydraulic structure or said hydraulic structure can be omitted. The electric brake system 10 can be a motor cylinder device that helps to supply pressurized brake fluid to one or more brake calipers associated with vehicle wheels in response to actuation of a master cylinder (not shown).

The electric brake system 10 includes a motor 12 having an output shaft connected to a pulley 14. A belt 18 connects the pulley 14 to a pulley 16. The brake system 10 further includes a housing 22 having a passage 24 for receiving a ball screw nut assembly 30 to be driven by the motor 12. The assembly 30 includes a shaft 32 axially movable within the passage 24 and along an axis 34.

Figure 2:
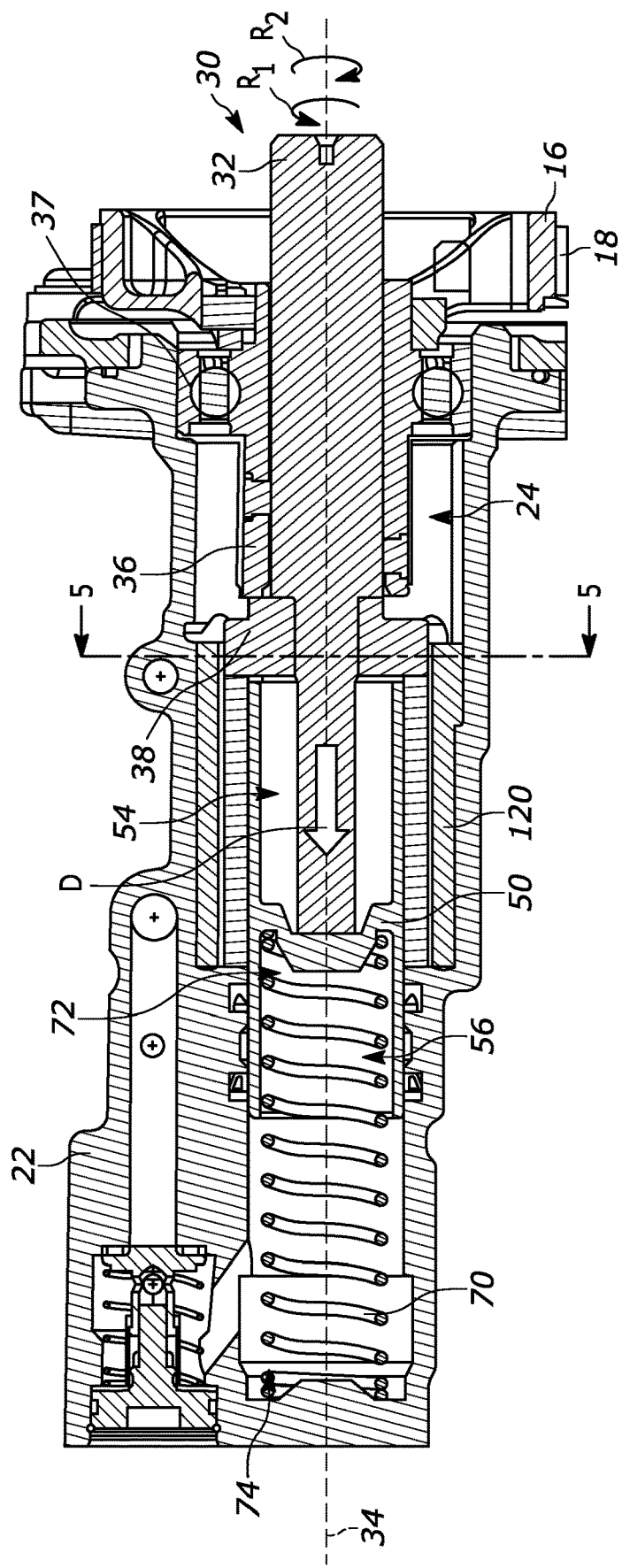
FIG. 2 is a section view taken along line 2-2 of FIG. 1A.

Referring to FIG. 2, a nut 36 receives the shaft 32 and is secured to the housing 22 within the passage 24. In particular, an outer race 37 of the nut 36 is fixed to the housing 22 while the nut is threadably engaged with the shaft 32. The nut 36 is rotatable about the axis 34 relative to the outer race 37. The pulley 16 is fixed for rotation with the nut 36. A projection or stopper (shown in phantom at 36a) extends axially from the nut 36.

An anti-rotation feature 38 is provided on the shaft 32 and helps to prevent rotation of the shaft in response to rotation of the nut 36. In one example, the feature 38 includes a pair of projections or tabs extending radially from the shaft 32. The tabs 38 can extend in opposite directions from one another, i.e., be diametrically opposed about the axis 34.

A piston 50 is provided in the passage 24 and includes a first blind passage 54 for receiving the shaft 32 such that shaft abuts the piston. A second blind passage 56 extends towards the first blind passage 54 and receives a spring 70. More specifically, the spring 70 includes a first end 72 positioned in the second blind passage 56 and engaging the piston 50 and a second end 74 engaging the housing 22. The spring 70 is a compression spring that biases the piston 70 towards the shaft 32.

Figure 3A:
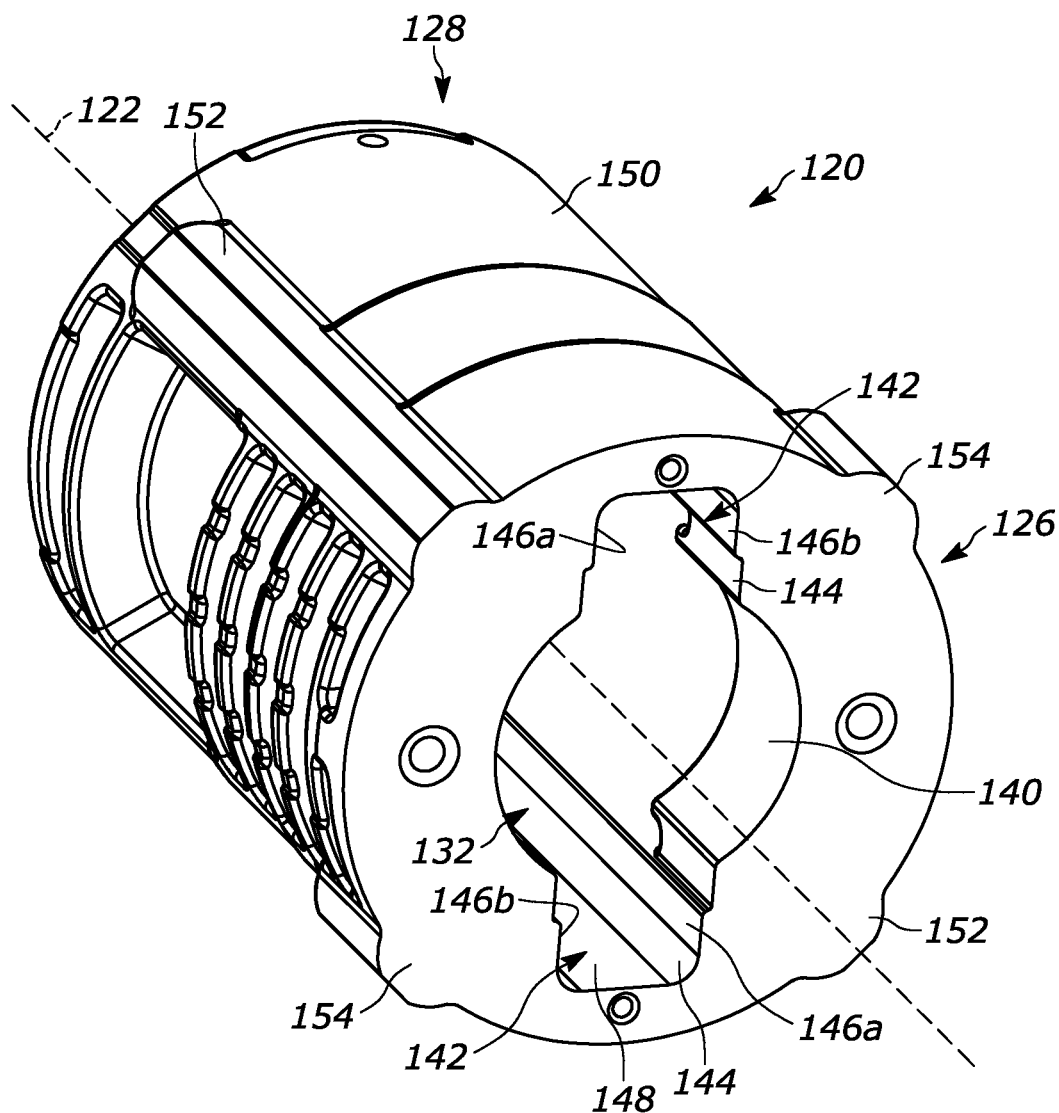
FIG. 3A is a front view of an example sleeve for the electronic brake system.
Figure 3B:
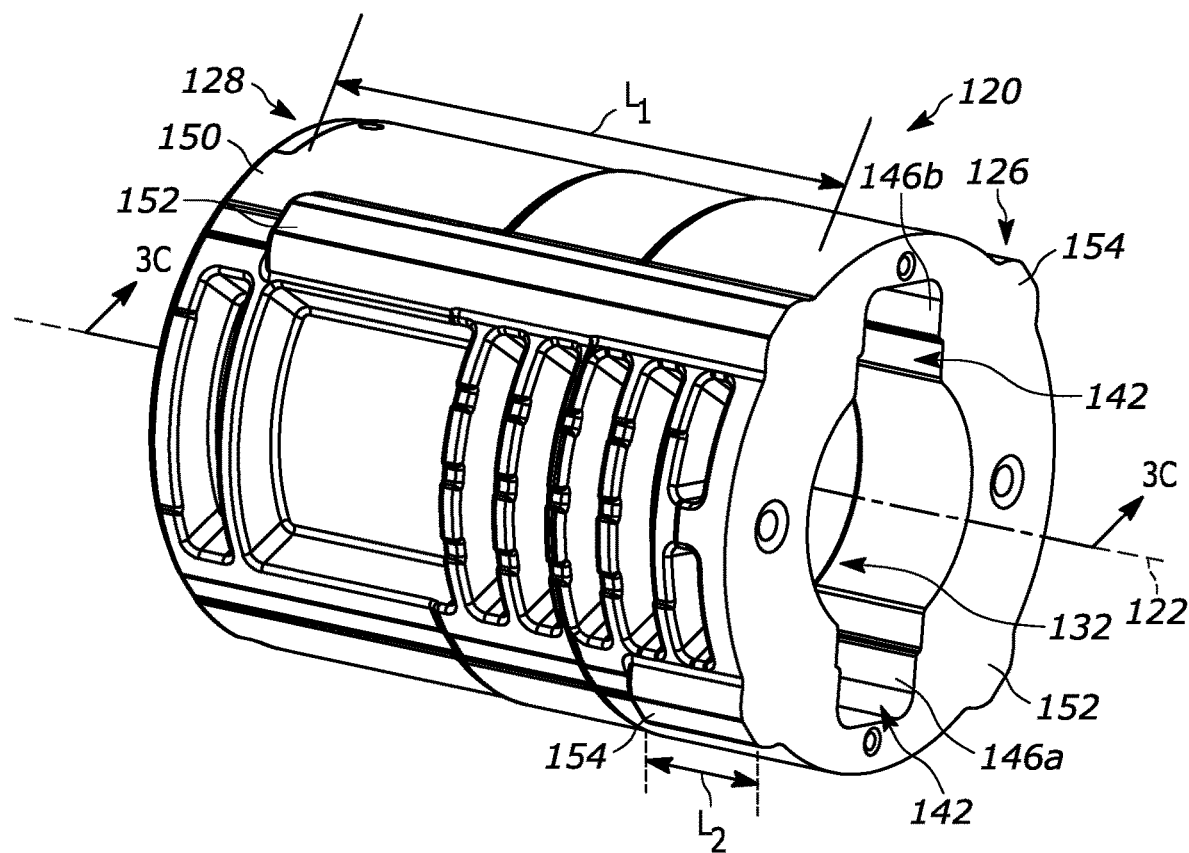
FIG. 3B is a side view of the sleeve of FIG. 3A.
Figure 3C:
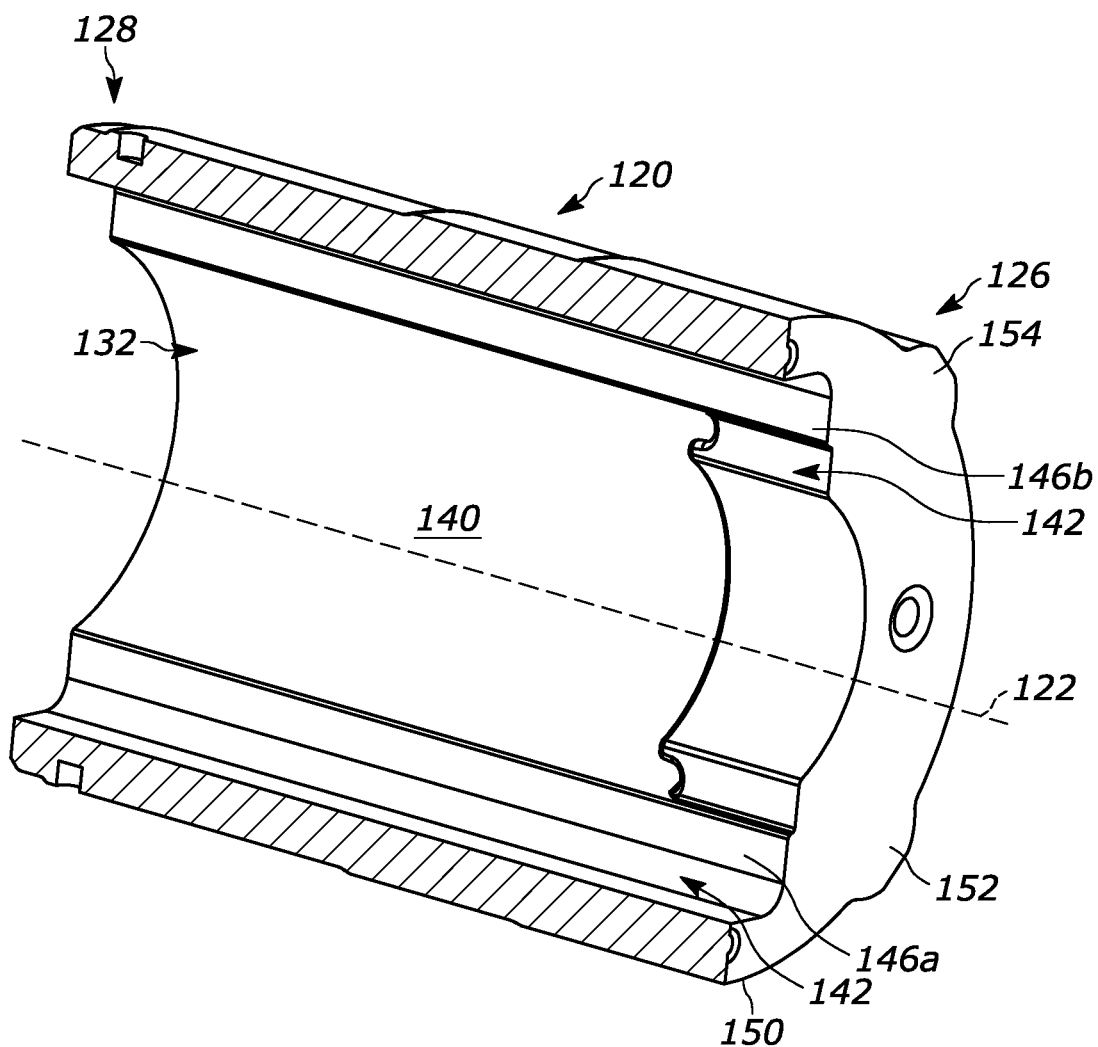
FIG. 3C is a section view taken along line 3C-3C of FIG. 3B.

A sleeve 120 is provided in the passage 24 radially between the housing 22 and the piston 50 for preventing rotation of the shaft 32. One example sleeve 120 is shown in FIGS. 3A-3C. Referring to FIGS. 3A-3B, the sleeve 120 extends along a centerline 122 from a first end 126 to a second end 128. An inner surface 140 defines a passage 132 extending the entire length of the sleeve 120 along the centerline 122. At the first end 126 of the sleeve 120, the inner surface 140 defines pockets 142. The pockets 142 can have a square or rectangular shape and are diametrically opposed from one another about the centerline 122. As shown, each pocket 142 includes a pair of first surfaces 146a, 146b extending parallel to one another on opposite sides of the centerline 122 and a second surface 148 extending generally circumferentially between the first surfaces.

The sleeve 120 also includes an outer surface 150. A series of projections 152, 154 extends from the outer surface and are arranged about the centerline 122. More specifically, a pair of first projections 152 extends along a first length $L_1$ of the sleeve 120 and are diametrically opposed from one another about the centerline 122. A second pair of projections 152 extends along a second length $L_2$ of the sleeve 120 and are diametrically opposed from one another about the centerline 122. The second length $L_2$ can be less than the first length $L_1$. Moreover, the first and second projections 152, 154 are all radially offset or misaligned from the pockets 142. In other words, the projections 152, 154 do not reside in the same plane as the pockets 142.

Figure 4:
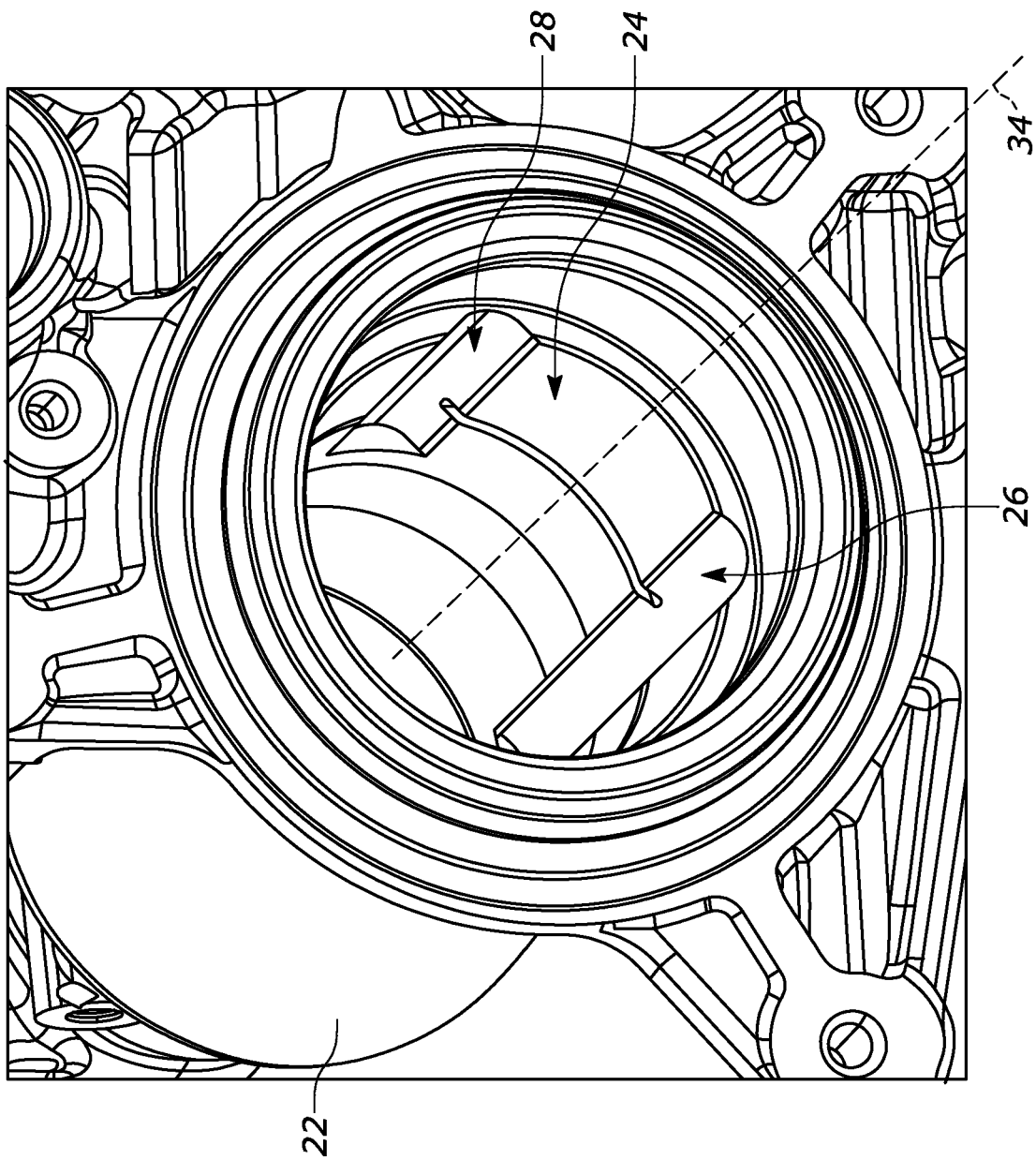
FIG. 4 is an enlarged view of a portion of a housing of FIG. 1B.

In any case, the housing 22 (see FIG. 4) includes grooves that correspond with the projections 152, 154 on the sleeve 120. To this end, a pair of first grooves 26 extends along the length of the passage 24 and is configured to slidably receive the first projections 152. A pair of second grooves 28 extends along the length of the passage 24 and is configured to slidably receive the second projections 154 in the axial—but not circumferential—direction. The grooves 26, 28 therefore have shapes, e.g., arcuate, that correspond with the shapes of the respective projections 152, 154. The projections 152, 154 and grooves 26, 28 cooperate to prevent relative rotation between the sleeve 120 and the housing 22.

During operation of the electric brake system 10, the motor 12 (FIG. 1A) supplies torque to the pulley 14 which, in turn supplies torque to the pulley 16 via the belt 18. Since the pulley 16 is keyed to the nut 36, rotation of the pulley 16 causes the nut to rotate in a first direction, e.g., the direction $R_1$ shown in FIG. 2, about the axis 34. The tabs 38 on the shaft 32 prevent rotation of the shaft and, thus, rotation of the nut 36 in the direction $R_2$ causes the shaft 32 to shift axially relative to the nut in the direction D towards the piston 50.

Referring to FIG. 2, advancing the piston 50 in the direction D or the direction opposite D selectively provides fluid communication between the passage 24 and either the front caliper(s) or rear caliper(s) (not shown). In other words, axially moving the piston 50 enables the electric brake system 10 to supply pressurized brake fluid to the calipers in response to actuation of the master cylinder in a known manner.

Figure 5:
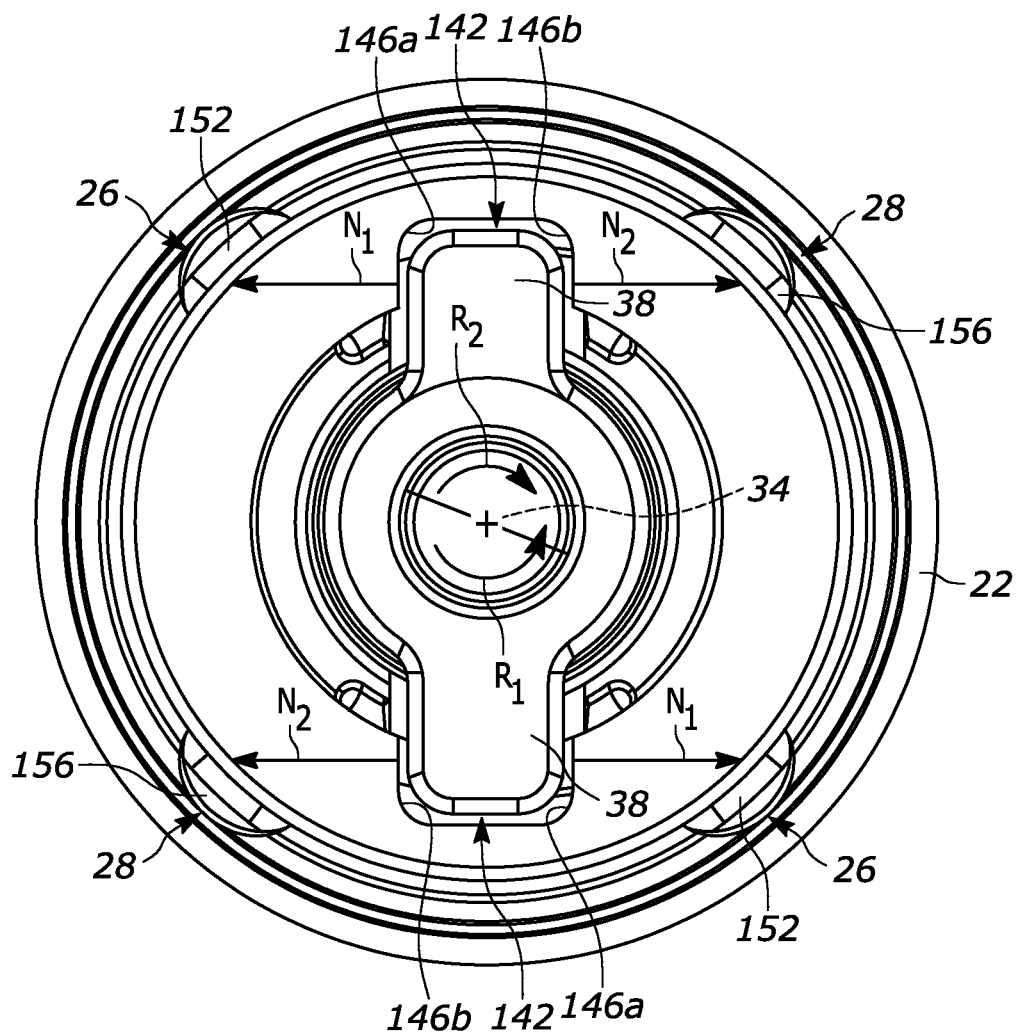
FIG. 5 is a section view taken along line 5-5 of FIG. 2.

Referring to FIG. 5, the sleeve 120 is advantageously configured to maximize the resistance to rotation of the tabs 38 in an efficient, multi-faceted manner. To this end, when the tabs 38 attempt to rotate in the direction $R_1$, they engage the first surfaces 146*a* of the pockets 142 and apply a force in the normal directions $N_1$. These directions $N_1$ are aligned with the first projections 152 and the grooves 26 associated therewith. Consequently, the cooperating projections 152 and grooves 26 support the torque applied by the tabs 38 when rotating in the direction $R_1$ to prevent rotation of the shaft 32 about the axis 34.

Similarly, when the braking operation is complete and retraction of the piston 50 is desired, the motor 12 reverses rotation such that the nut 36 rotates in a direction $R_2$ opposite the direction $R_1$. When this occurs, the tabs 38 attempt to rotate in the direction $R_2$ and engage the first surfaces 146*b* of the pockets 142. This applies a force in the normal directions $N_2$. These directions $N_2$ are aligned with the second projections 154 and the grooves 28 associated therewith. Consequently, the cooperating projections 154 and grooves 28 support the torque applied by the tabs 38 when rotating in the direction $R_2$ to prevent rotation of the shaft about the axis 34.

That said, the tabs 38 are limited to sliding movement along the first surfaces 146*a*, 146*b* relative to the sleeve 120 in a direction D and the direction opposite the direction D. To this end, the first surfaces 146*a*, 146*b* provide sliding interfaces with the tabs 38 with each sliding interface being aligned in its normal direction $N_1$ or $N_2$ with one of the first or second projections 152, 154.

The orientation of the normal forces $N_1$, $N_2$ and the associated projections 152, 154 is advantageous because the forces are transmitted in a straight line to the projections rather than in bending. In other words, no bending moment is created between the tabs 38 and the projections 152 or 154 during rotation of the nut 36, which would produce undesirable tensile stress in the sleeve 120. As a result, the mating connections between the projections 152, 154 and grooves 26, 28 becomes rigid and thereby reduces stress within the sleeve 120. The lowered stress levels allow the material used to construct the sleeve 120 to be lower grade and reduced in volume.

Furthermore, forming the projections 152, 154 and mating grooves 26, 28 with different lengths $L_1$, $L_2$ allows the sleeve 120 to accommodate both forward and reverse movement of the shaft 32 without wasting material. More specifically, advancing the shaft 32 to move the piston 50 and apply the service brake generates a relatively lower torque over a longer axial movement of the shaft. With this in mind, the length $L_1$ of the first projections 152 that receive the torque when the nut 36 rotates in the direction $R_1$ to advance the shaft 32 corresponds with the full length of the shaft 32 stroke during service braking.

When pressure in the second blind passage 56 high in response to motor 18 power being interrupted, the piston 50 and shaft 32 shift axially in the direction opposite D. This causes the nut 36 to rotate in the direction $R_1$ until the stopper 36*a* abuts the tab 38, at which point the high impact torque is transmitted through the tab to the surfaces 146*b* and ultimately to the shorter second projections 154.

The configuration of the projections 152, 154 and corresponding grooves 26, 28 is also advantageous in that it helps to properly orient the sleeve 120 in the housing 22, thereby preventing improper installation in the passage 24. To this end, the projections 152, 154 can only be received in the grooves 26, 28 having the same corresponding lengths, e.g., the first projections in the longer first grooves and the second projections in the shorter second grooves. Since the first and second projections 152, 154 are diametrically opposed from one another and collectively symmetric about the centerline 122 the sleeve 120 has two proper installation positions within the passage 24 rotated 180* from one another.

Figure 6A:
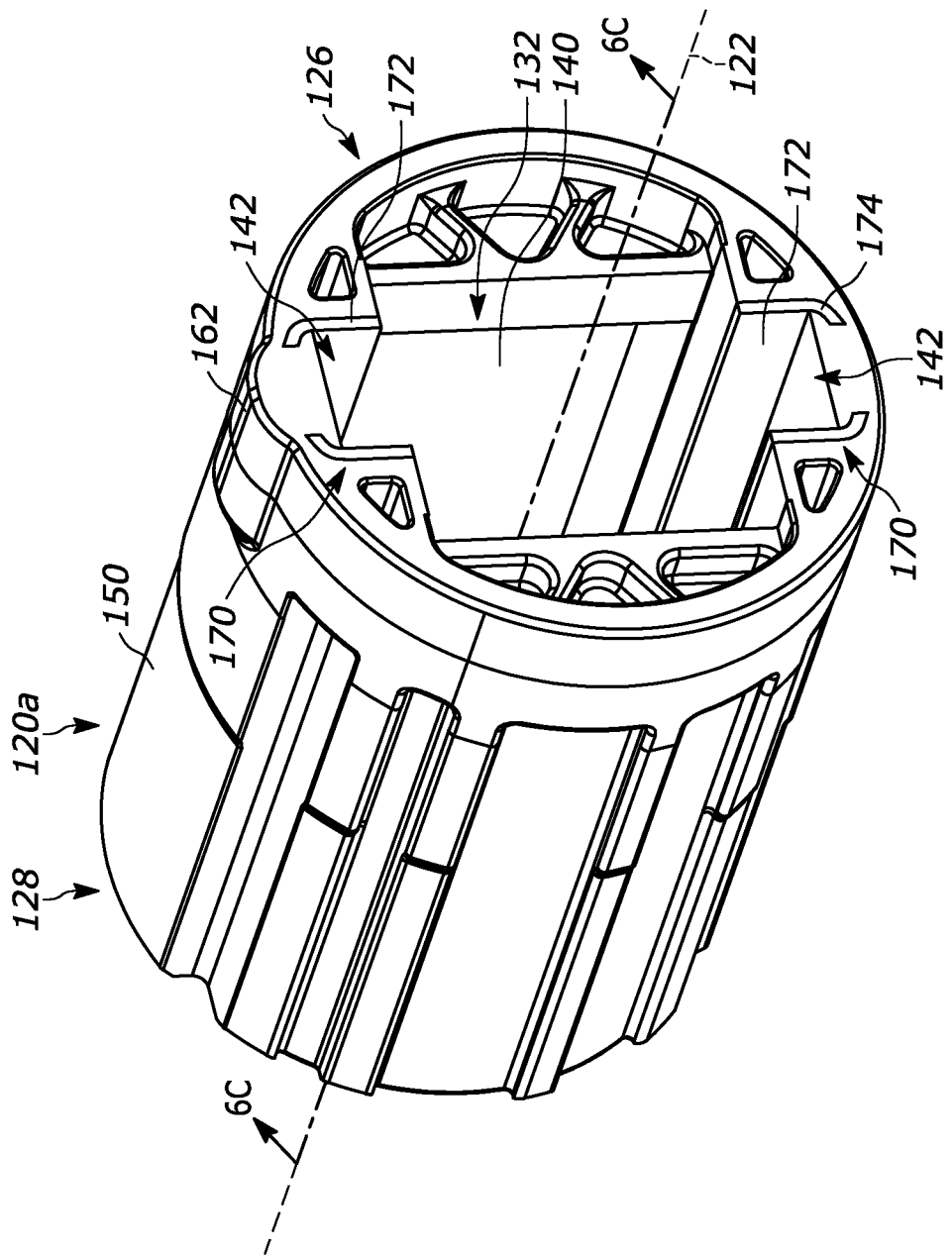
FIG. 6A is a front view of another example sleeve for the electronic brake system.
Figure 6B:
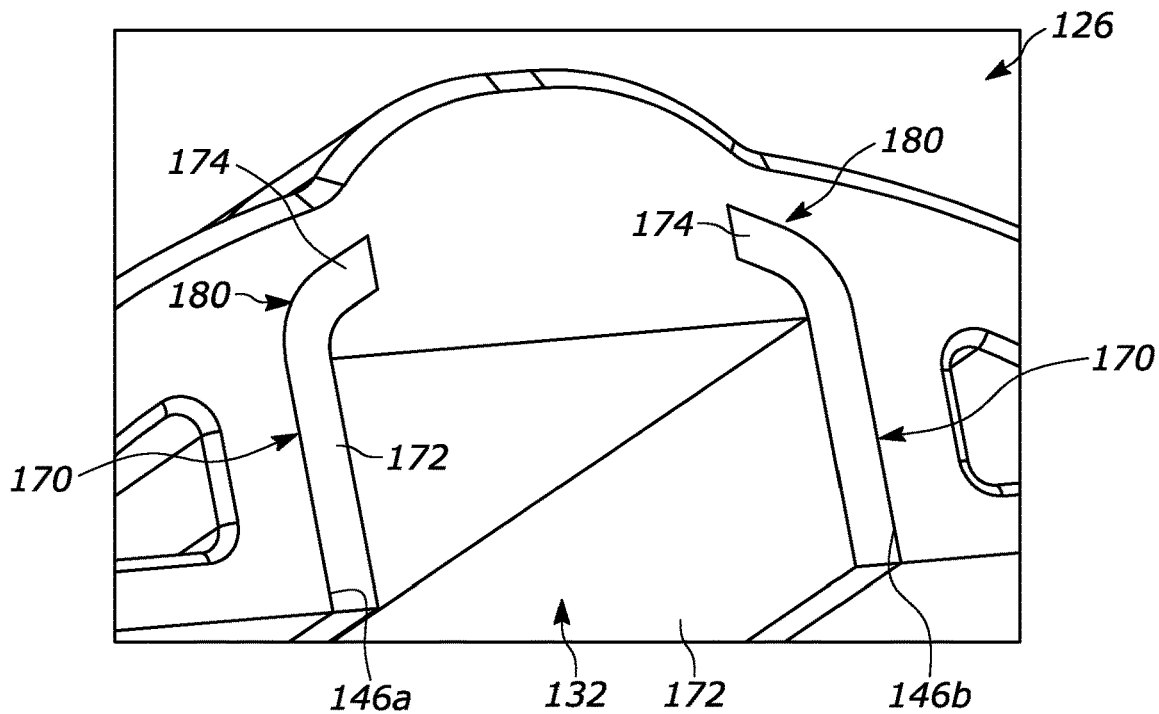
FIG. 6B is an enlarged view of a portion of FIG. 6A.
Figure 6C:
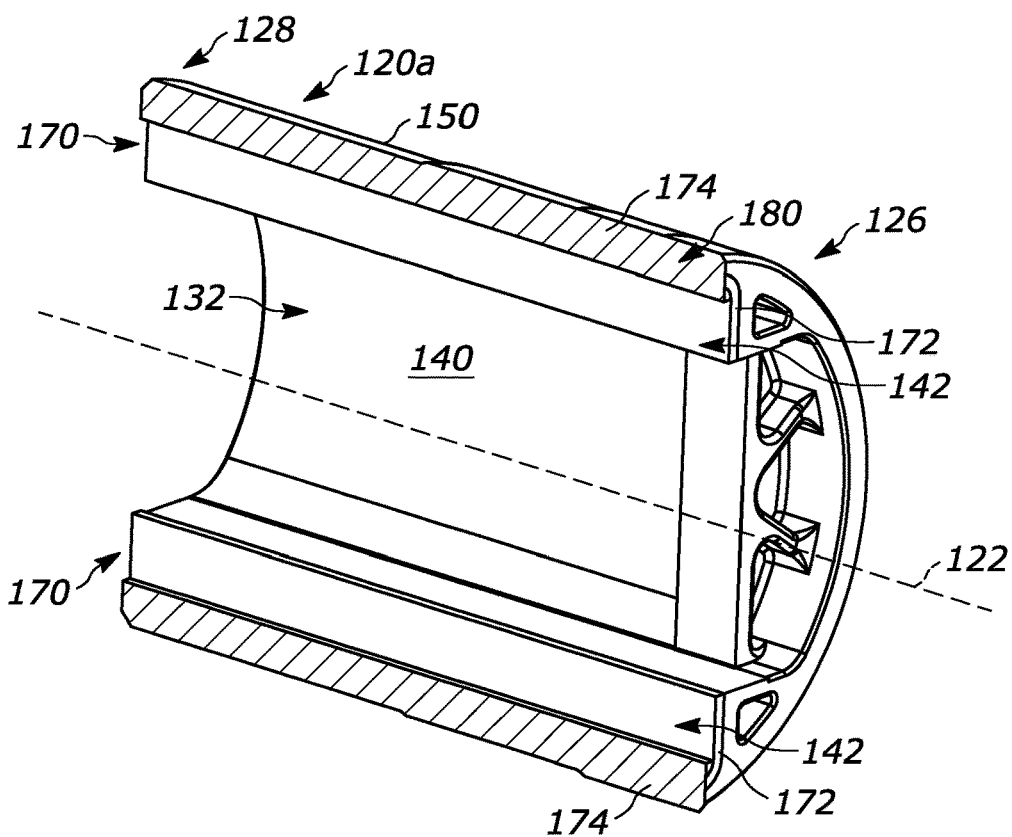
FIG. 6C is a section view taken along line 6C-6C of FIG. 6A.

FIGS. 6A-6C illustrate another example sleeve 120*a* in accordance with the present invention. Features in FIGS. 6A-6C that are similar to features in FIGS. 1A-5 are given the same reference number. In the sleeve 120*a* of FIGS. 6A-6C, a single projection 162 extends radially outward from the outer surface 150 and along the length of the sleeve 120*a* parallel to the centerline 122. The projection 162 can have a length equal to, for example, the length $L_2$ of the second projections 154. The projection 162 can be radially aligned with the pockets 142.

Instead of the inner surface 140 providing the sliding interface with the tabs 38, inserts 170 are provided. Each insert 170 includes a planar first portion 172 and a curved/arcuate second portion 174 extending from the first portion. Two inserts 170 can be provided for each pocket 142. In such a configuration, the first portions 172 abut the first surfaces 146*a*, 146*b* and the second portions 174 extend into recesses 180 (see FIG. 6B) in the body of the sleeve 120*a*. As shown, the recesses 180 associated with each pocket 142 extend radially outward therefrom then towards one another. Other configurations for the recesses 180 are contemplated (not shown).

When the second portions 174 are positioned within the recess 180, only the first portions 172 are visible from the passage 132. The cooperating second portion 174/recess 180 helps anchor the insert 170 within the sleeve 120a and prevent relative movement therebetween.

The inserts 170—rather than the surfaces 146a 146b themselves—provide the sliding interface with the tabs 38. That said, the insert 170 can be formed from a material that is harder than the material of the sleeve 120a. In one example, the insert 170 is formed from metal whereas the sleeve 120a is formed from plastic. The inserts 170 can be integrally molded into the sleeve 120a or overmolded. In either case, the inserts 170 are embedded within the body of the sleeve 120a.

This configuration is advantageous in that it allows the sleeve 120a to be made from a lightweight, inexpensive material while providing a sliding interface, i.e., the first portion 172 of the metal insert 170, that is harder and more durable than the rest of the sleeve. This helps improve durability and wear resistance.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An anti-rotation sleeve for an electric brake system having a shaft received in and movable relative to a passage of a housing, comprising:
    a body extending along a centerline from a first end to a second end and having an inner surface defining a passage for receiving the shaft and pockets extending radially from the passage configured to provide sliding interfaces with tabs on the shaft; and
    projections provided on an outer surface of the body and extending parallel to the centerline for cooperating with the housing to prevent rotation of the sleeve relative to the housing, wherein each projection is aligned with a normal direction of one of the interfaces:
    wherein the projections comprise:
    first projections diametrically opposed from one another about the centerline; and
    second projections diametrically opposed from one another and different from the first projections;
    wherein the first projections extend a first length along the sleeve and the second projections extend a second length along the sleeve less than the first length.

2. The anti-rotation sleeve recited in claim 1, wherein the projections have an arcuate shape and are configured to extend into arcuate shaped grooves in the housing.

3. The anti-rotation sleeve recited in claim 1, wherein the first length corresponds with a full stroke length of the shaft within the passage.

4. The anti-rotation sleeve recited in claim 1, wherein the first projections prevent rotation of the sleeve in response to torque applied to the tabs in a first direction and the second projections prevent rotation of the sleeve in response to torque applied to the tabs in a second direction opposite the first direction.

5. The anti-rotation sleeve recited in claim 1, wherein the sleeve is formed from plastic.

6. The anti-rotation sleeve recited in claim 1, wherein the projections are misaligned from the pockets.

7. An anti-rotation sleeve for an electric brake system having a shaft received in and movable relative to a passage of a housing, comprising:
    a body extending along a centerline from a first end to a second end and having an inner surface defining a passage for receiving the shaft and pockets extending radially from the passage configured to receive tabs on the shaft, the body being formed from a first material;
    an insert provided in each pocket for forming a sliding interface with the tabs, each insert being formed from a second material different from the first material; and
    a projection provided on an outer surface of the body and extending parallel to the centerline for cooperating with the housing to prevent rotation of the sleeve relative to the housing;
    wherein the sleeve is formed from plastic and the inserts are formed from metal.

8. The anti-rotation sleeve recited in claim 7, wherein the projection has an arcuate shape and is configured to extend into an arcuate shaped groove in the housing.

9. The anti-rotation sleeve recited in claim 7, wherein each insert comprises:
    a first portion provided in the pocket; and
    a second portion extending into the body.

10. The anti-rotation sleeve recited in claim 9, wherein the first portion is planar and the second portion is arcuate.

11. The anti-rotation sleeve recited in claim 9, wherein the body is overmolded with the second portion.

12. The anti-rotation sleeve recited in claim 9, wherein the second portion is embedded within the body.

13. An anti-rotation sleeve for an electric brake system having a shaft received in and movable relative to a passage of a housing, comprising:
    a body extending along a centerline from a first end to a second end and having an inner surface defining a passage for receiving the shaft and pockets extending radially from the passage configured to provide sliding interfaces with tabs on the shaft; and
    projections provided on an outer surface of the body and extending parallel to the centerline for cooperating with the housing to prevent rotation of the sleeve relative to the housing, wherein each projection is aligned with a normal direction of one of the interfaces;
    wherein the projections comprise at least one first projection extending a first length along the sleeve and at least one second projection extending a second length along the sleeve less than the first length.

14. The anti-rotation sleeve recited in claim 13, wherein the projections have an arcuate shape and are configured to extend into arcuate shaped grooves in the housing.

15. The anti-rotation sleeve recited in claim 13, wherein the sleeve is formed from plastic.

16. The anti-rotation recited in claim 13, wherein the projections are misaligned from the pockets.

* * * * *